April 16, 1963
R. COLOMBET ET AL
3,085,305
FITTING CONNECTOR
Filed Feb. 24, 1959
2 Sheets-Sheet 1
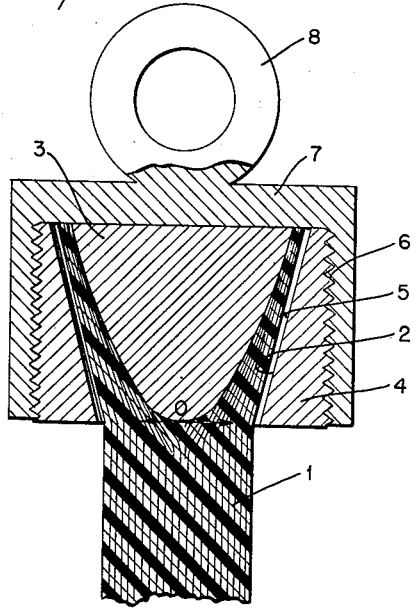
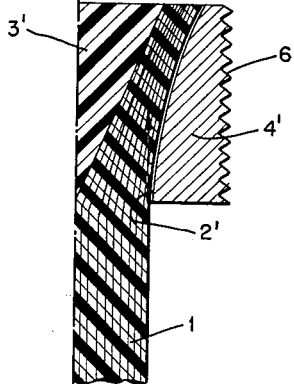
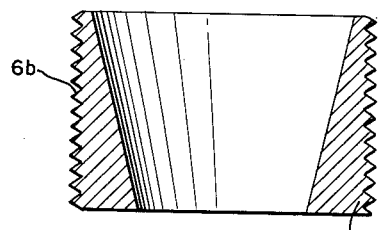
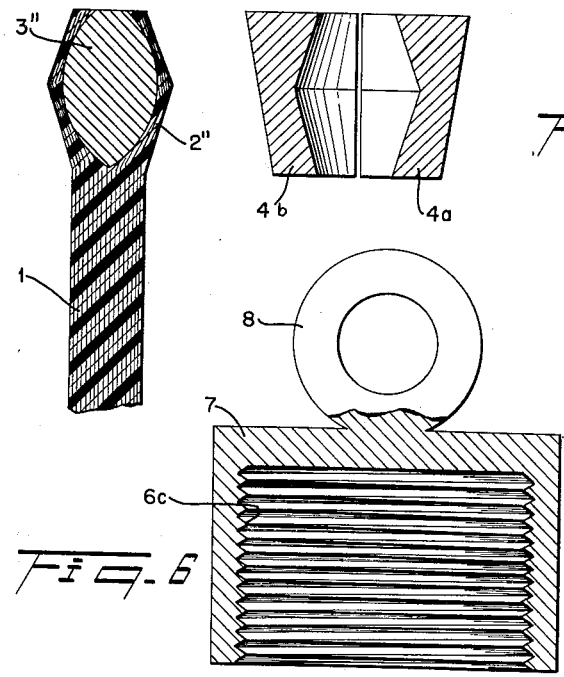
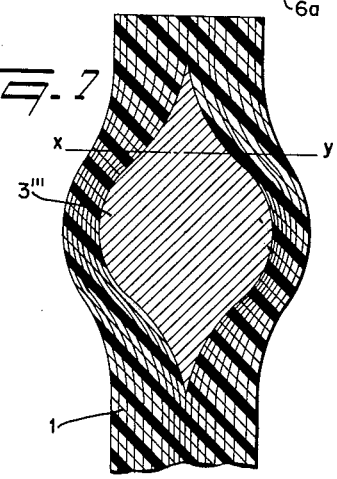
INVENTORS
ROBERT COLOMBET
GUSTAVE ANDRE'
BY
Bauer and Seymour
ATTORNEYS United States Patent Office 3,085,305
Patented Apr. 16, 1963

3,085,305
FITTING CONNECTOR
Robert Colombet, Paris, and Gustave André, Gif-sur-Yvette, Seine et Oise, France, assignors to Compagnie de Saint-Gobain, Paris, France
Filed Feb. 24, 1959, Ser. No. 795,098
Claims priority, application France Feb. 28, 1958
2 Claims. (Cl. 24—126)

This invention relates to a connection between a fitting, such as a terminal tension-sustaining fitting, and rods, bars, or cables made of reinforced material. Such rods, bars, and cables may, for example, be made up of a bundle of longitudinally extending reinforcing fibers or filaments held together by a suitable plastic material.

It is obviously desirable that the mechanical strength of connections between such rods, bars, or cables, shall be at least equal to that of the reinforced plastic article. When an article is made of a homogeneous material, such as glass, metal, plastics, etc., such result is easily attained, as by modifying a section of the article by the provision of a shoulder or a simple boss on the article, the fitting then being attached to such shoulder or boss. When the material of which the article is made is not homogeneous, however, but is made of longitudinal fibers or filaments embedded in a bonding material such as a resin, the problem of making a suitable connection thereto as, for example, securing a terminal fitting thereto, is much more difficult.

In articles consisting of a bundle of reinforcing fibers embedded in bonding material, the volume of the fibers is constant from one end of the article to the other. Consequently any modification of the cross section of the article causes a corresponding change in the proportion of the fibers with respect to the quantity of bonding material. As a result, if such proportion has been fixed at an optimum value, considering the application to which the article is to be put, for the main body of such article, such proportion is not necessarily maintained at the zone of the article where the connection is made. Thus in such region the mechanical strength of the material is necessarily reduced.

Further, the resultant differences in mechanical properties thus produced between the main body of the article and those at the locations of the connections thereto as, for example, at its ends when terminal fittings are to be secured thereto, caused by the mechanical working required, produces an irregular distribution of forces which can only reduce the total strength of the assembly.

In the majority of cases the weakest region of an article of this type, as it is actually made, is that which corresponds to the beginning of the terminal enlargement thereon; this fact may be readily verified by submitting a number of samples to destructive tension tests. In the great majority of samples submitted to such tests, the fracture therein occurs at the beginning of the terminal enlargement thereon.

The present invention has as an object thereof, the overcoming of such defects, and permits the fabrication of articles of the type described with fittings connected thereto, such articles being homogeneous from the point of view of their mechanical strength.

In accordance with the preferred embodiment of the invention, wherein a terminal fitting is attached to a reinforced plastic article such as a rod, bar, or cable, herein generally called a "rod," a rod spreading insert is deposed within the end of the rod. Such insert, which may be made of a suitable material having the required compressive strength, such as metal, plastic, and the like, has its external surface of such configuration that it causes an enlargement of the desired contour of the rod. In accordance with the invention, the enlargement is such that the area of transverse section of the spread rod overlying the insert is constant and is equal to the section of the rod itself in planes transverse to the longitudinal axis of the rod.

It is obvious that, in accordance with the invention, since neither the useful section of the reinforced material nor the proportion of the bonding material to the reinforcing fibers thereof has been changed throughout such enlargement, the enlargement is entirely homogeneous from the point of view of its mechanical strength. As a result, such enlargement has no pronounced zones or weaknesses, and is fully as strong as the unspread, main portions of the rod, the inner end of the enlargement, in constructions in accordance with the invention, not displaying any weaknesses as in the above described prior connections or joints.

In accordance with the invention the exterior profile of the enlargement determines the shape or profile of the spreader body, and vice versa. The exterior profile of the enlargement is chosen with regard to the use to which the rod and attached fitting is to be put. For example, consideration must be given to the manner in which the enlargement is to be attached to and supported by metallic pieces such as rings and the like. It is easy to find, by calculation, the exact shape or profile of the spreader body corresponding to the exterior profile chosen for the enlargement on the rod. Thus, for example, when the enlargement is conical, the spreader body is a hyperboloid of revolution and, conversely, if the spreader body is conical the exterior surface of the enlargement must be a surface of revolution, the elements of which lying in meridian planes are hyperbolas.

Obviously other kinds of surfaces which are not hyperboloids and cones may be employed, respectively, for the exterior of the spreader body and for the exterior shape of the enlargement. As will be seen hereinafter there may be employed, for example, surfaces whose meridians present a point of inflection, that is, a point wherein the curvature changes in direction, the only condition to be observed being that the area of the various transverse (right angle) sections through the reinforced material of the rod at the zone of spreading thereof must equal the transverse (right angle) section of the main, unspread portion of the rod.

If the nature of the material forming the bonding medium in the reinforced rod is such that its adherence to the spreader body is sufficient to resist the forces tending to thrust such body from the rod when the latter is under tension, constructions as thus described above, in which, for example, a cone is associated with a hyperboloid and in which the diameter of the enlargement constantly increases in the direction of application of tension to the rod, are satisfactory.

If, on the contrary, the adherence between the spreader body and the bonding material of the reinforced rod is insufficient to prevent ejection of the spreader body from the rod under the influences of the forces to which the rod is subjected, there may be employed another embodiment of the invention wherein the spreader body and the enlargement on the rod are so related that their diameters do not constantly increase throughout their entire lengths in the direction of application of tensile forces to the rod. In such latter construction, both the spreader body and the enlargement have a maximum diameter in a zone intermediate their lengths, whereby to overcome any slipping of the spreader body longitudinally with respect to the rod. In such embodiment, for example, the external surface of the enlargement on the rod may be in the form of an integral body having the shape of two cones which converge in opposite directions and have their bases positioned in contact, and the spreader body may be in the form of an integral body having the shape of two hyperboloids having their larger ends (bases) in contact, such hyperboloids converging in opposite directions. The cone and the hyperboloid positioned adjacent the outer end of the rod may be truncated.

When the form of the enlargement is such that it increases in diameter toward the outer end of the rod, as for example, when the enlargement is conical, the surrounding metallic part which engages the enlargement and is connected to the point of application of tensile forces to which the rod is to be subjected, may be, for example, a ring. Such ring has an internal bore or passage corresponding in shape to the external surface of the enlargement and is positioned in place around the rod before the formation of the terminal enlargement thereon.

In other cases, and particularly those in which the enlargement is of such shape that it first increases in the direction of its length to a maximum value and thereafter decreases, as for example, the above described bi-conical enlargement, the metallic member surrounding and securing the enlargement to a fitting is made of a ring formed of at least two mating shell portions presenting a cavity having a shape corresponding to the exterior surface of the enlargement.

The mating elements making up such ring are maintained in place around the enlargement by a second ring which may, for example, have an inner conical cavity if the shape of the outer surface of the first ring is conical. The first and second rings are preferably secured together as by a threaded connection between them.

There are shown in the accompanying drawing a number of preferred embodiments of a connection made in accordance with the invention. In it to be understood that such embodiments are illustrative only, and that the invention is not limited thereto. In the drawings, wherein like reference characters designate similar parts throughout the several views:

FIG. 1 is a fragmentary view partially in axial section and partially in elevation showing a first embodiment of connection in accordance with the invention between a reinforced rod and a terminal fitting;

FIG. 2 is a fragmentary view in vertical axial section through a second embodiment of connection between a reinforced rod and terminal fitting.

Figure 8:
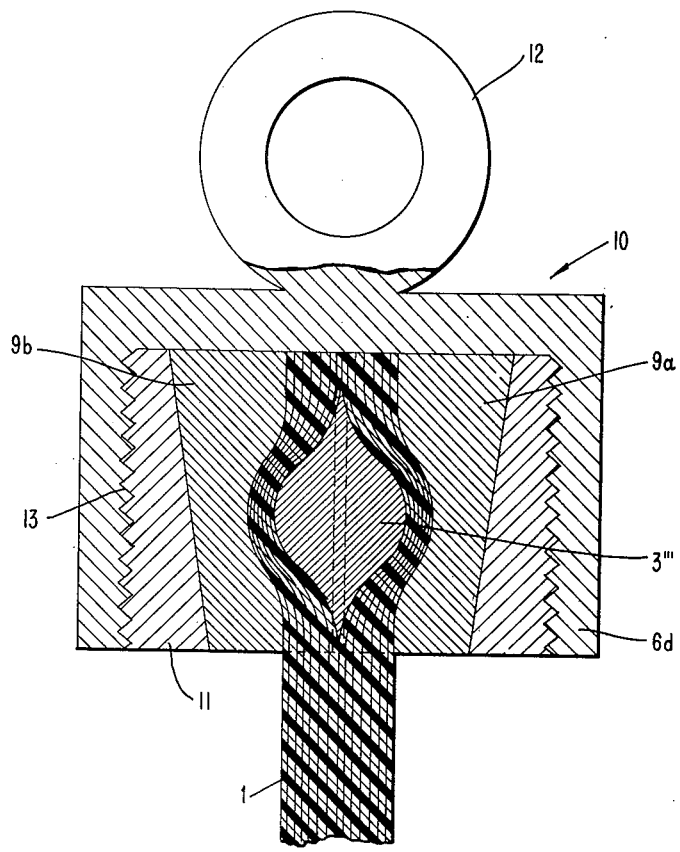

FIGS. 3–6, inclusive, show respectively, the several elements of a third embodiment of connection between a rod and a terminal fitting;

FIG. 3 is a view in vertical axial section through the end of the spreader body or insert employed in such third embodiment;

FIG. 4 is a view in axial section through the axially divided first or the inner ring element of such connection;

FIG. 5 is a view in axial section through the second or outer ring member of such connection;

FIG. 6 is a view partially in axial section and partially in elevation of the outer main body of the terminal fitting in the embodiment of FIGS. 3–6, inclusive.

FIG. 7 is a view in axial vertical section through an end of a reinforced rod containing a spreader body or insert made in accordance with a fourth embodiment of the invention; and FIG. 8 is a view in axial vertical section through a terminal fitting connected to a reinforced rod containing a spreader body or insert made in accordance with the embodiment of FIG. 7, certain parts being shown in elevation.

In FIG. 1 the reference character 1 designates the terminal position of a cylindrical reinforced rod of the above described construction, that is, made up of a bundle of reinforcing fibers held together by a bonding material. The end of such rod is shown expanded or opened out at a terminal zone, the exterior 2 of which is conical. In the outer end of such spread-out portion of the rod there is positioned a spreader body or an insert 3, which is in the form of a hyperboloid of revolution. The thus enlarged end of the rod is positioned within a ring or ferrule 4 the interior surface 5 of which is conical. Ring 4 is threaded on its outer surface, as indicated as 6, such threads interfitting with threads on the internally threaded side wall of the terminal fitting 7. Fitting 7 carries at its outer end a ring 8 by which it may be attached to another element such as a chain, hook, etc.

In FIG. 2 there is shown a rod 1 similar to that shown in FIG. 1. In FIG. 2, however, the spreader insert 3' is conical and the exterior surface 2' of the enlargement on the rod 1 is a surface of revolution in the form of a hyperboloid. The internal surface of ring or ferrule 4 which cooperates with the outer surface 2' of the enlargement is accordingly in the form of a similar hyperboloid.

It will be seen that in the case of FIG. 1, wherein the external surface of the enlargement is conical and the external surface of the spreader body is a hyperboloid of revolution, the curve in an axial plane through the enlargement is an hyperbola which has its central point or vertex lying on the axis of rod 1 in a transverse plane through the rod. In FIG. 2, on the other hand, the spreader body 3' is conical and the hyperbola defined by the intersection of an axial plane through the rod and the exterior surface of the enlargement has a tangent which is parallel to the axis of the rod and coincides with the generatrix of the main part of the cylindrical rod 1.

In FIGS. 3–6, inclusive, there is shown another embodiment of connection, wherein the external surface of the enlargement on the rod is bi-conical, the upper end of the spreader body 3'' is truncated, and the spreader body or insert is in the form of a bi-hyperboloid, the upper hyperboloid of which is also being truncated. The inner ring or ferrule is, in this instance (FIG. 4), made up of two axially split elements 4a, 4b which are mirror images of each other, such elements when presented in mating relationship having a bi-conical cavity therewithin. The outer surface of the inner ring element made up of parts 4a, 4b, is in the form of a downwardly converging truncated cone which is adapted to interfit with the similarly shaped inner surface of a second or outer ring 6a. The outer surface of ring 6a is threaded at 6b, and may be threadedly interfitted with the internally threaded side wall 6c of the terminal fitting 7 (FIG. 6).

In assemblying the connector made up of the elements of FIGS. 3–6, inclusive, the spreader body or insert 3'' is placed within the end of rod 1 to form the enlargement 2''. The outer ring 6a is then placed over the rod 1, the inner ring 4a, 4b being thereafter mounted upon the enlargement. The outer ring 6a is then slid upwardly along the rod 1 so as to be telescoped over the inner ring 4a, 4b, and thus to hold it in place. Following this, the terminal fitting body 7 is screwed on to the outer ring 6a. The terminal connection is then complete.

In FIG. 7 there is fragmentarily shown a portion of a fourth embodiment of connection in accordance with the invention such connection being particularly advantageous in certain applications wherein the connection is subjected to arduous service conditions. FIG. 8 shows the complete connection which is fragmentarily shown in FIG. 7. In such connection the exterior surface of the spreader body 3''' and of the enlargement in the rod formed thereby are surfaces of revolution of which the meridian curves present points of inflection, that is, a change in their directions of curvature. The connection of FIGS. 7 and 8 is particularly advantageous because it produces a very regular division of the forces in the zone of enlargement of the rod without imposing unduly rapid changes in curvature upon the reinforcing fibers or filaments. Such curvatures of the enlargement and spreader body, in particular, eliminate the sharp angles which are necessary in the case of FIG. 3, for example, wherein angles are formed at the zones at which the bases of the two opposed cones or hyperboloids are joined. Further, the construction of the connection of the invention shown in FIGS. 7 and 8 permits the resultant of the forces exerted upon the spreader body or insert to be at a minimum, thereby eliminating all danger that the spreader body will slip longitudinally with respect to the rod. If desired, the spreader body 3′′′ of FIG. 7 may be truncated, for example, along the line x—y to remove therefrom the pointed end which is closer to the end of the rod 1. The enlargement on the rod shown in FIG. 7 is, in the finally assembled connection shown in FIG. 8 seated in a surrounding split ring or ferrule 9a, 9b which in turn is connected to the main body of a fitting such as a terminal fitting 10. The surrounding ring may, for example, be of a construction similar to that shown in FIG. 4, the cavity in such ring, of course having such configuration as fairly accurately to interfit with the outer surface of the enlargement of FIG. 7. The surrounding split ring 9a, 9b may be retained in the fitting 10 by an internal nut 11 connected to the sidewall of the body of the fitting by screw threads 13. The body of the fitting 10 may carry a ring 12 by which it may be attached to another element such as a chain, hook, etc.

The embodiments of the connection of the invention shown in the various figures of the drawing are illustrated with rods whose sections are circular. It is possible, without departing from the scope of the present invention, to employ rods of other than circular section, for example, elliptical, square, polygonal, etc. In each of such cases the shape of the spreader body or insert will be so chosen as to preserve the equality between the area of the reinforced material in the zone of the enlargement in the rod and the section of the rod in its main, unspread portion.

As many apparently widely different embodiments of the present invention may be made without departing from the spirit and scope thereof, it is to be understood that the invention is not limited to the specific embodiments shown and described herein.

What is claimed is:

1. A tension-sustaining connection between a rod made of plastic material with longitudinally extending reinforcing fibers distributed substantially uniformly throughout the rod and a tension-sustaining fitting on such rod, said connection comprising a rod-spreading insert disposed within said rod and forming an enlargement on the rod, said insert having an end portion which converges in a direction longitudinally of the rod opposite the direction of the tension to be applied to the rod, the spread portion of the rod intimately contacting the end portion of the insert throughout the extent of the latter, said fitting having a ferrule disposed around and having an inner surface intimately contacting the enlargement on the rod at the transverse zone of the rod containing the insert, the area of the sections of the spread portion of the rod overlying the said end portion of the insert in planes transverse to the longitudinal axis of the rod being substantially a constant, the converging portion of the rod-spreading insert being of a generally conical shape, and the inner surface of the ferrule which engages the outer surface of the spread portion of the rod being in the form of an hyperboloid converging in the same direction as the rod-spreading insert.

2. In combination, a rod made of plastic material with longitudinally extending reinforcing fibers distributed substantially uniformly throughout the rod, a tension-sustaining fitting on such rod, and a tension-sustaining connection between the rod and the fitting, said connection comprising a rod-spreading insert disposed within said rod and forming an enlargement on the rod, said insert having an end portion which converges in a direction longitudinally of the rod opposite the direction of the tension to be applied to the rod, the converging portion of the rod-spreading insert being of a generally conical shape, the spread portion of the rod intimately contacting the end portion of the insert throughout the extent of the latter, said fitting having a ferrule disposed around the enlargement on the rod and having an inner surface intimately contacting such enlargement at the transverse zone of the rod containing the insert, such inner surface of the ferrule being in the form of an hyperboloid converging in the same direction as the rod-spreading insert, the area of the sections of the spread insert of the rod overlying the said end portion of the insert in planes transverse to the longitudinal axis of the rod being substantially a constant.

References Cited in the file of this patent

UNITED STATES PATENTS

| | | |
|---|---|---|
| 427,302 | Dumas | May 6, 1890 |
| 728,689 | Am Ende | May 19, 1903 |
| 2,093,403 | Sertillange | Sept. 21, 1937 |
| 2,118,103 | Oeding | May 24, 1938 |
| 2,239,026 | Wagner | Apr. 22, 1941 |

FOREIGN PATENTS

| | | |
|---|---|---|
| 555,610 | Belgium | Sept. 7, 1957 |
| 963,104 | France | Dec. 19, 1949 |
| 1,149,707 | France | July 22, 1957 |
| 429,572 | Great Britain | May 31, 1935 |
| 654,500 | Great Britain | June 20, 1951 |